United States Patent
Chow et al.

(10) Patent No.: US 6,226,693 B1
(45) Date of Patent: May 1, 2001

(54) METHOD AND SYSTEM FOR LOGICAL EVENT MANAGEMENT

(75) Inventors: ChungHen Chow; Nurcan Coskun; Kalpesh Jashbhai Patel; Bruce Allan Tate, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/941,323

(22) Filed: Sep. 30, 1997

Related U.S. Application Data

(63) Continuation of application No. 08/375,149, filed on Jan. 19, 1995, now abandoned.

(51) Int. Cl.$^7$ ............................. G06F 9/00; G06F 9/46
(52) U.S. Cl. ..................................... 709/318; 709/319
(58) Field of Search ................................ 395/680–685; 709/300–305, 310–332

(56) References Cited

U.S. PATENT DOCUMENTS

| | | | |
|---|---|---|---|
| 4,672,532 | | 6/1987 | JongeVos ............................. 364/200 |
| 4,734,854 | | 3/1988 | Afshar ................................. 364/200 |
| 5,097,533 | | 3/1992 | Burger et al. ........................ 395/500 |
| 5,233,686 | | 8/1993 | Rickenbach et al. ................ 395/158 |
| 5,237,684 | | 8/1993 | Record et al. ....................... 395/650 |
| 5,280,613 | | 1/1994 | Chan et al. .......................... 395/700 |
| 5,341,478 | * | 8/1994 | Travis et al. ......................... 395/700 |
| 5,430,875 | * | 7/1995 | Ma ...................................... 395/700 |
| 5,438,659 | * | 8/1995 | Notess et al. ....................... 395/155 |
| 5,566,337 | * | 10/1996 | Szymanski et al. ................. 395/733 |
| 5,613,090 | * | 3/1997 | Willems .............................. 395/500 |

FOREIGN PATENT DOCUMENTS

0474339 * 11/1992 (EP) .
5-324339   7/1993 (JP) ................................. G06F/9/44

OTHER PUBLICATIONS

Macintosh, Inside Macintosh:Interapplication Communication; Chapters 3–6, Jul. 1993.*
Macintosh, Inside macintosh:Macintosh Toolbox Essentials; Chapter 2, 1992.*
"Portable Object–Oriented Event Manager", IBM Technical Disclosure Bulletin, vol. 37, issue 6B, pp. 553–556, Jun. 1994.*
SOM Objects Developer Toolkit Users Guide Chap. 12, Jun. 1993.*
Ford, Dan; "Associations in C++" Dr. Dobb's Journal on CDROM, Aug. 1994.*
Class Objects in Som Nurcan Coskun & Roger Sessions, IBM Personal Systems Developer (Summer 92), pp. 67–77.*
Object–Oriented Programming in OS/22.0, Roger Sessions & Nurcan Coskun, IBM Personal System Developer (Winter 92) pp. 107–119.*

* cited by examiner

Primary Examiner—Majid Banankhah
Assistant Examiner—P. G. Caldwell
(74) Attorney, Agent, or Firm—Jeffrey S. LaBaw; Duke W. Yee

(57) ABSTRACT

A method and system for efficiently handling events occurring in an environment in a data processing system. The data processing system includes multiple environments and objects that may be used in different environments. Each object includes an action that is triggered in response to an event. An event manager object is created for handling events from different environments. Events are registered for the objects. An action is triggered using the event manager object in response to detecting an event occurring in the data processing system, wherein events occurring in an environment are efficiently handled.

22 Claims, 9 Drawing Sheets

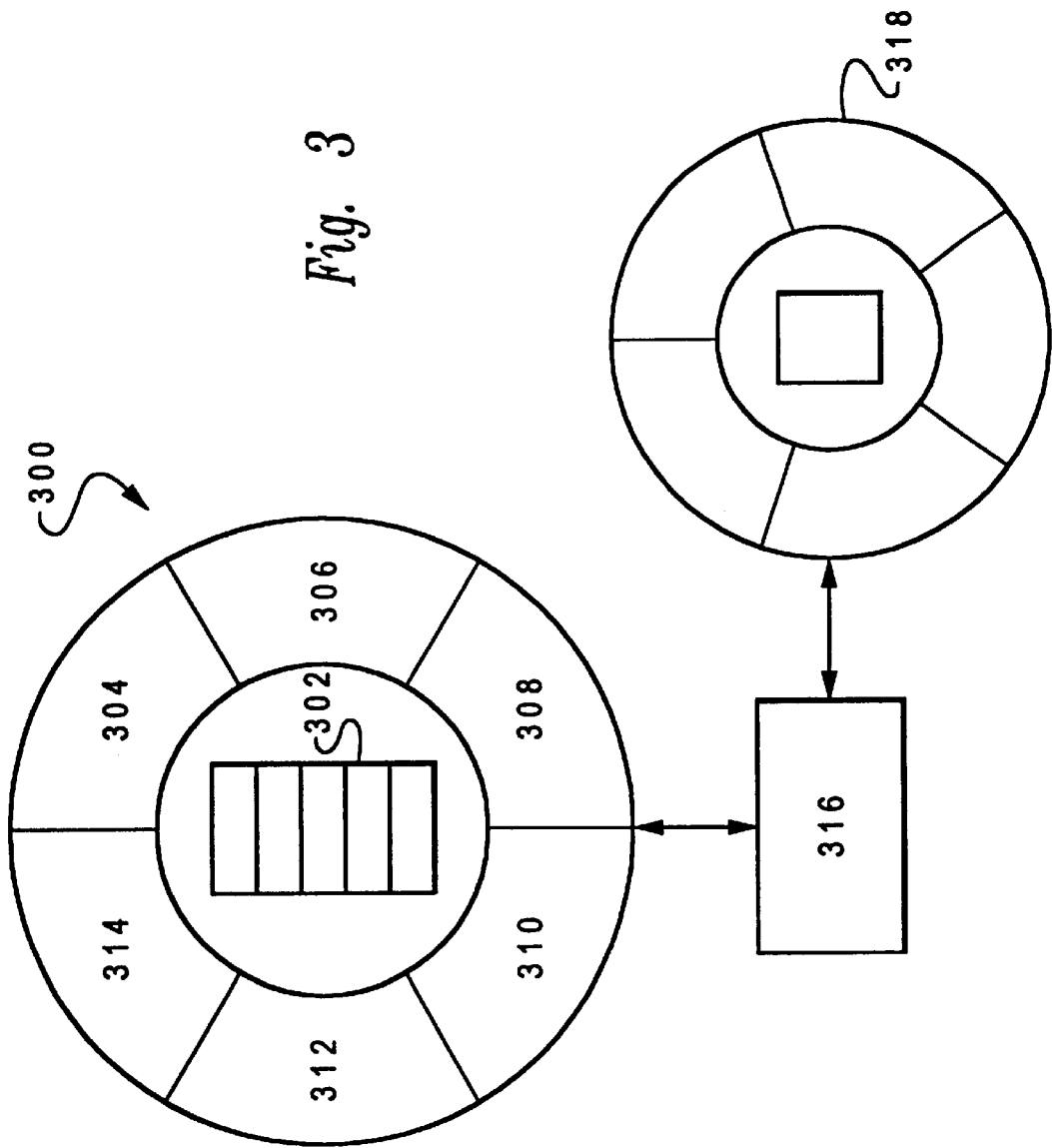

METHOD AND SYSTEM FOR LOGICAL EVENT MANAGEMENT

CROSS-REFERENCE TO RELATED APPLICATIONS

This is a continuation of prior application Ser. No. 08/375,149 filed on Jan. 19, 1995 now abandoned.

The present application contains subject matters related to co-pending application Ser. No. 08/368,189, entitled METHOD AND SYSTEM FOR OBJECT ORIENTED NOTIFICATION, filed on even date herewith and assigned hereof and incorporated by reference herein.

BACKGROUND OF THE INVENTION

1. Technical Field

The present invention relates in general to an improved data processing system and in particular to an improved method and system for managing events in a graphic user interface. Still more particularly, the present invention relates to a method and system for managing events in a graphic user interface in a manner independent of the environment.

2. Description of the Related Art

The development of application and system software for data processing systems has traditionally been a time consuming task. The field of software engineering has attempted to overcome the limitations of traditional techniques by proposing new, more efficient software development models. Object oriented programming has emerged as a promising technology that will allow rapid development, implementation and customization of objects. Each new object has certain data attributes and processes or methods that operate on that data. Data is said to be "encapsulated" by an object and can only be modified by the object methods are invoked by sending a message to an object identifying the method and supplying any needed arguments.

Object oriented systems have two important properties in addition to encapsulation. "Inheritance" is the ability to derive a new object from an existing object and inherit all properties, including methods and data structure, from the existing object. The new object may have certain unique features which are supplied as overrides or modifications to the existing class. For example, a new subclass needs to specify only the functions and data that distinguish that class from the existing more general class.

The ability to override an existing method description enables polymorphism, the ability to have a single message to an object be processed in different ways depending on the object itself.

Inheritance and polymorphism create a powerful structure for implementing new software systems. The software developer does not have to develop each piece of a system, he or she need only specify the unique features of the system.

The power of object oriented systems is realized through the development of system "frameworks." A framework is a collection of base classes that can be used by a system implementor to create a final systems product. The framework is defined and developed to work together as a system. Conceptually, the framework is much like a set of standard hardware components used by computer hardware builders. Each of the components has certain defined functions and interfaces and the engineer assembles these components according to a particular design to create a unique hardware system.

One object oriented programming system is the System Object Model (SOM). More information on SOM can be found in SOMobjects Developer Toolkit Users Guide, version 2.0, June 1993, available from International Business Machines Corporation.

In object oriented system and others, data may be manipulated in many ways in a data processing system including: data accessing; data encoding; data communication; data compression; data conversion; data entry; data exchange; data filing; data linking; data locking; data manipulation; data mapping; data recording; data sorting; and data transferring. The large amounts of data which are available to the user of a data processing system often become overwhelming in magnitude and complexity.

As a result of the increasing complexity of data processing systems, attempts have been made to simplify the interface between a user and the large amounts of data present within a data processing system. One example of an attempt to simplify the interface between a user and a data processing system is the use of a so-called Graphical User Interface (GUI) to provide an intuitive and graphical interface between the user and the data processing system. A graphic user interface includes a collection of graphic icons, menus, clipboards, desk accessories, and alert boxes, each accessible through the use of a mouse. The Common User Access (CUA) interface is one example of such a GUI. Common User Access and CUA are trademarks of International Business Machines Corporation. The Common User Access interface is often employed to organize and present large amounts of data to a user in a graphical and intuitive manner. More information on Common User Access interface may be found in Systems Application Architecture Common User Access Interface Design available from International Business Machines Corporation, publication no. SC34-42900-00.

Management of events drive the flow of control in GUI programming. Each event may have associated actions, which need to be performed for that particular event. An event management system has the responsibility to recognize and perform (dispatch) the associated action.

Two types of events exist: external (physical) and internal (logical). External events are generated by some physical device, such as a mouse, keyboard, touch screen, or the like. On the other hand, internal events are generated by some logic, such as a program or object. The internal events are typically generated by modules within programs executing in a data processing system. As cross-platform programming becomes more and more desirable, platform independent event management becomes very important in event driven systems, i.e. OS/2, AIX from IBM, and Windows, NT, and Windows95 from Microsoft Corporation.

Typically each platform has its own event management system. Since event management drives the flow control of the program, other code in a data processing system can easily become depend on that given event management. For example, a drag action; under OS/2 starts by depressing a right mouse button and moving the mouse. Under windows, a drag action begins by depressing the left mouse button and moving the mouse; under AIX, a drag action begins by depressing the middle mouse button and moving the mouse. "OS/2" is a trademark of International Business Machines Corporation; AIX is International Business Machines' implementation of UNIX, a trademark of UNIX System Laboratories, Inc. "AIX" is a trademark of International Business Machines Corporation. In this case, if the recognition of a drag event is not isolated at the event management level, three different versions of code for drag action with each version of the code being depend on each one of the platforms, also called "environments".

Therefore, it would be advantageous to have a method and system for providing platform specific event recognition in a event management system that is environment independent.

SUMMARY OF THE INVENTION

It is one object of the present invention to provide an improved data processing system.

It is another object of the present invention to provide an improved method and system for managing events in a graphic user interface.

It is yet another object of the present invention to provide a method and system for recognizing and responding events in a graphic user interface in a manner independent of platform.

The present invention provides a method and system for efficiently handling events occurring in an environment in a data processing system. The data processing system includes multiple environments and objects that may be used in different environments. Each object includes an action that is triggered in response to an event. An event manager object is created for handling events from different environments. Events are registered for the objects. An action is triggered using the event manager object in response to detecting an event occurring in the data processing system, wherein events occurring in an environment are efficiently handled.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
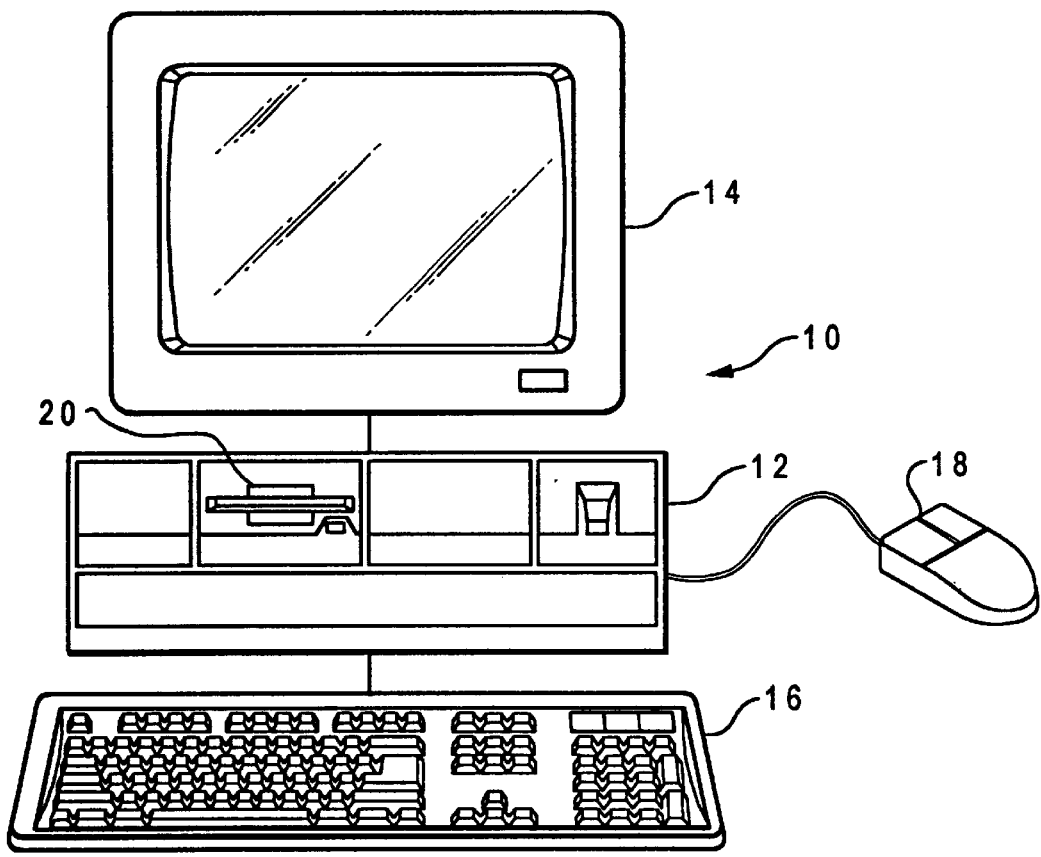
FIG. 1 depicts a data processing system in the form of a personal computer in which the present invention can be employed is depicted.

Referring now to the figures, and in particular to FIG. 1, a data processing system, personal computer system 10, in which the present invention can be employed is depicted. As shown, personal computer system 10 comprises a number of components, which are interconnected together. More particularly, a system unit 12 is coupled to and can drive an optional monitor 14 (such as a conventional video display). A system unit 12 also can be optionally coupled to input devices such as a PC keyboard 16 or a mouse 18. Mouse 18 includes right and left buttons (not shown). The left button is generally employed as the main selector button and alternatively is referred to as the first mouse button or mouse button 1. The right button is typically employed to select auxiliary functions as explained later. The right mouse button is alternatively referred to as the second mouse button or mouse button 2. An optional output device, such as a printer 20, also can be connected to the system unit 12. Finally, system unit 12 may include one or more mass storage devices such as the diskette drive 22.

As will be described below, the system unit 12 responds to input devices, such as PC keyboard 16, the mouse 18, or local area networking interfaces. Additionally, input/output (I/O) devices, such as floppy diskette drive 22, display 14, printer 20, and local area network communication system are connected to system unit 12 in a manner well known. Of course, those skilled in the art are aware that other conventional components also can be connected to the system unit 12 for interaction therewith. In accordance with the present invention, personal computer system 10 includes a system processor that is interconnected to a random access memory (RAM), a read only memory (ROM), and a plurality of I/O devices.

In normal use, personal computer system 10 can be designed to give independent computing power to a small group of users as a server or a single user and is inexpensively priced for purchase by individuals or small businesses. In operation, the system processor functions under an operating system, such as IBM's OS/2 operating system or DOS. OS/2 is a registered trademark of International Business Machines Corporation. This type of operating system includes a Basic Input/Output System (BIOS) interface between the I/O devices and the operating system. BIOS, which can be stored in a ROM on a motherboard or planar, includes diagnostic routines which are contained in a power on self test section referred to as POST.

Figure 2:
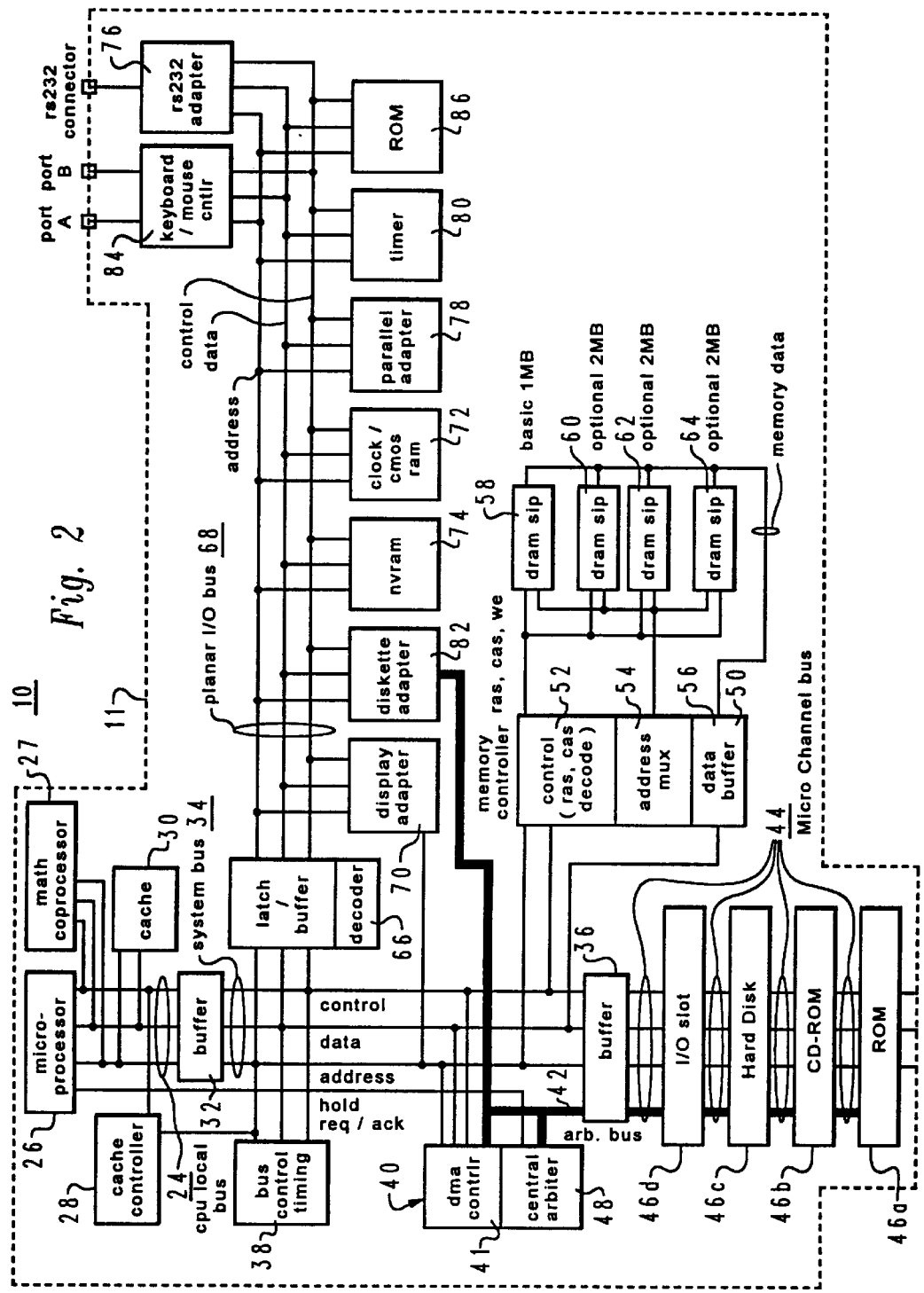
FIG. 2 is a block diagram of a personal computer system illustrating the various components of personal computer system in accordance with the present invention.

Prior to relating the above structure to the present invention, a summary of the operation in general of personal computer system 10 may merit review. Referring to FIG. 2, there is shown a block diagram of personal computer system 10 illustrating the various components of personal computer system 10 in accordance with the present invention. FIG. 2 further illustrates components of planar 11 and the connection of planar 11 to I/O slots 46a–46d and other hardware of personal computer system 10. Connected to planar 11 is the system central processing unit (CPU) 26 comprised of a microprocessor which is connected by a high speed CPU local bus 24 through a bus controlled timing unit 38 to a memory control unit 50 which is further connected to a volatile random access memory (RAM) 58. While any appropriate microprocessor can be used for CPU 26, one suitable microprocessor is the Pentium microprocessor, which is sold by Intel Corporation. "Pentium" is a trademark of Intel Corporation.

While the present invention is described hereinafter with particular reference to the system block diagram of FIG. 2, it is to be understood at the outset of the description which follows, it is contemplated that the apparatus and methods in accordance with the present invention may be used with other hardware configurations of the planar board. For example, the system processor could be an Intel 80286, 80386, or 80486 microprocessor. These particular microprocessors can operate in a real addressing mode or a protected addressing mode. Each mode provides an addressing scheme for accessing different areas of the microprocessor's memory.

Returning now to FIG. 2, CPU local bus 24 (comprising data, address and control components) provides for the connection of CPU 26, an optional math coprocessor 27, a cache controller 28, and a cache memory 30. Also coupled on CPU local bus 24 is a buffer 32. Buffer 32 is itself connected to a slower speed (compared to the CPU local bus) system bus 34, also comprising address, data and control components. System bus 34 extends between buffer 32 and a further buffer 36. System bus 34 is further connected to a bus control and timing unit 38 and a Direct Memory Access (DMA) unit 40. DMA unit 40 is comprised of a central arbitration unit 48 and a DMA controller 41. Buffer 36 provides an interface between the system bus 34 and an optional feature bus such as the Micro Channel bus 44. "Micro Channel" is a registered trademark of International Business Machines Corporation. Connected to bus 44 are a plurality of I/O slots 46a–46d for receiving Micro Channel adapter cards which may be further connected to an I/O device or memory. In the depicted example, I/O slot 46a has a hard disk drive connected to it; I/O slot 46b has a CD-ROM drive connected to it; and I/O slot 46c has a ROM on an adapter card connected to it. Other devices, such as a modem may be connected to an I/O slot. An arbitration control bus 42 couples the DMA controller 41 and central arbitration unit 48 to I/O slots 46 and diskette adapter 82. Also connected to system bus 34 is a memory control unit 50 which is comprised of a memory controller 52, an address multiplexer 54, and a data buffer 56. Memory control unit 50 is further connected to a random access memory as represented by RAM module 58. Memory controller 52 includes the logic for mapping addresses to and from CPU 26 to particular areas of RAM 58. While the personal computer system 10 is shown with a basic 1 megabyte RAM module, it is understood that additional memory can be interconnected as represented in FIG. 2 by the optional memory modules 60 through 64.

A further buffer 66 is coupled between system bus 34 and a planar I/O bus 68. Planar I/O bus 68 includes address, data, and control components respectively. Coupled along planar bus 68 are a variety of I/O adapters and other peripheral components such as display adapter 70 (which is used to drive an optional display 14), a clock 72, nonvolatile RAM 74 (hereinafter referred to as "NVRAM"), a RS232 adapter 76, a parallel adapter 78, a plurality of timers 80, a diskette adapter 82, a PC keyboard/mouse controller 84, and a read only memory (ROM) 86. The ROM 86 includes BIOS which provides the user transparent communications between many I/O devices.

Clock 72 is used for time of day calculations. NVRAM 74 is used to store system configuration data. That is, the NVRAM will contain values which describe the present configuration of the system. For example, NVRAM 74 contains information which describe the capacity of a fixed disk or diskette, the type of display, the amount of memory, etc. Of particular importance, NVRAM 74 will contain data which is used to describe the system console configuration; i.e., whether a PC keyboard is connected to the keyboard/mouse controller 84, a display controller is available or the ASCII terminal is connected to RS232 adapter 76. Furthermore, these data are stored in NVRAM 74 whenever a special configuration program is executed. The purpose of the configuration program is to store values characterizing the configuration of this system to NVRAM 76 which are saved when power is removed from the system.

Connected to keyboard/mouse controller 84 are ports A and B. These ports are used to connect a PC keyboard (as opposed to an ASCII terminal) and mouse to the PC system. Coupled to RS232 adapter unit 76 is an RS232 connector. An optional ASCII terminal can be coupled to the system through this connector.

Specifically, personal computer system 10 may be implemented utilizing any suitable computer such as the IBM PS/2 computer or an IBM RISC SYSTEM/6000 computer, both products of International Business Machines Corporation, located in Armonk, N.Y. "RISC SYSTEM/6000" is a trademark of International Business Machines Corporation and "PS/2" is a registered trademark of International Business Machines Corporation.

Figure 3:
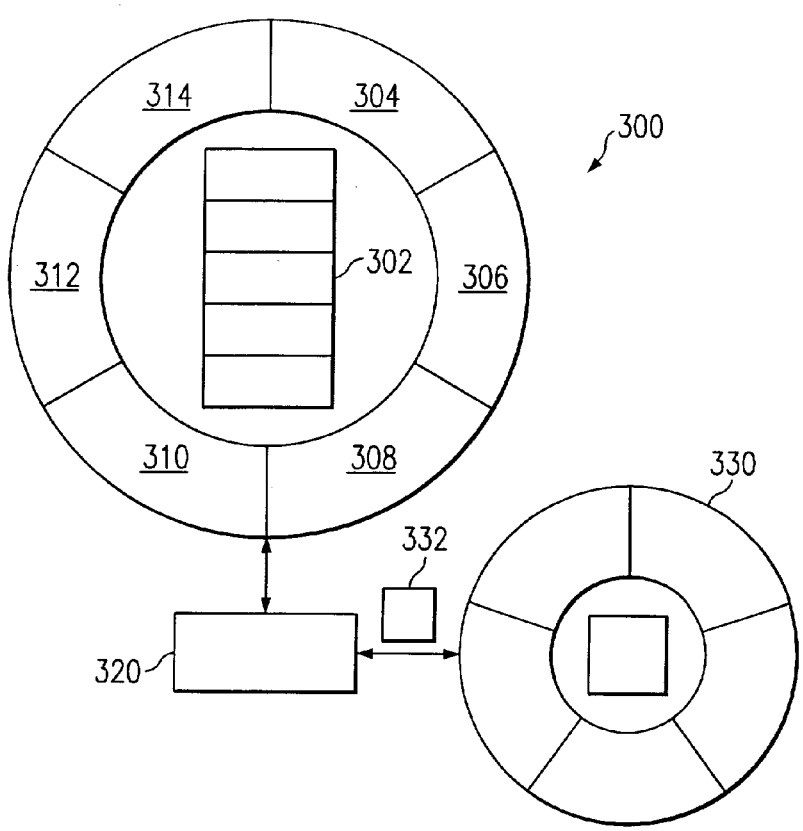
FIG. 3 is a diagram of objects in an object oriented system in accordance with a preferred embodiment of the present invention.
Figure 8:
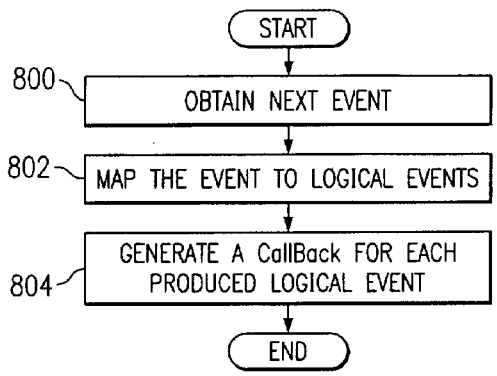
Figure 9:
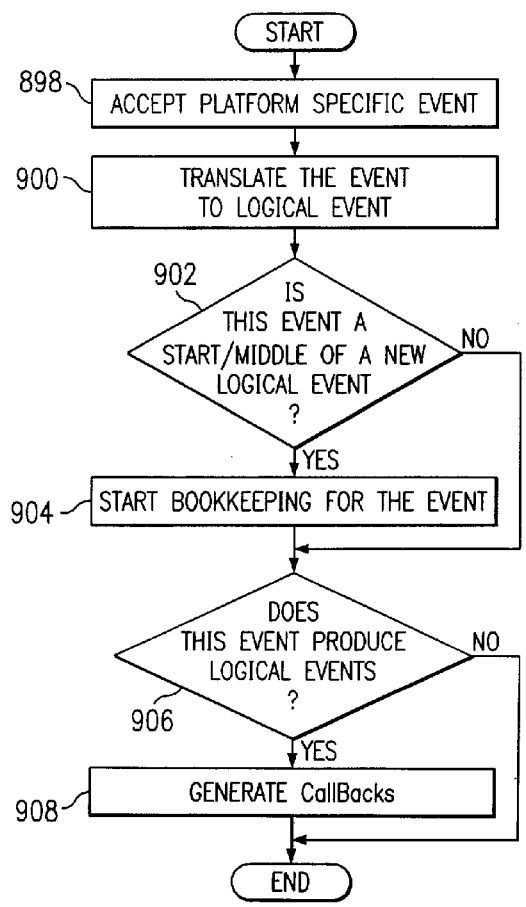
Figure 10:
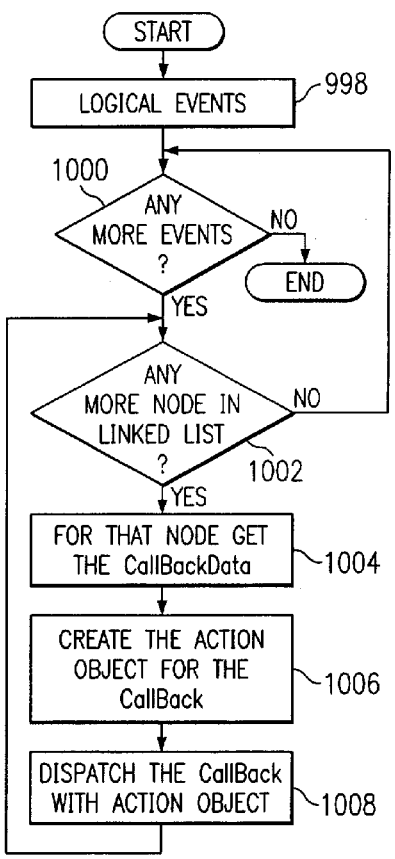

With reference to FIG. 3, a diagram of objects in an object oriented system is depicted in accordance with a preferred embodiment of the present invention. An object encapsulates data and the methods needed to operate on that data. Objects can be represented by a "doughnut diagram" such as shown in FIG. 3. Object data is shown in the center 302 surrounded by the applicable methods 304 to 314. Data 302 may be modified only by the methods of that object. Methods 304–314 are invoked by receiving messages from other objects. A typical object oriented system will have a message router 320 that routes messages between objects. Thus, object 330 causes Method C 308 to be invoked by sending a message 332 to message router 320 that in turn sends message 322 to Method C 308 of object 300.

Object frameworks are constructed to provide a set of objects for application and system developers to use to construct a delivered system. The IBM System Object Model (SOM) framework, for example, provides a language independent set of objects for use in systems development.

Objects are grouped into classes of related objects. The class description contains information relevant to all objects in a class, including a description of instance variables maintained by each of the objects and the available object methods. An object instance is created (or "instantiated") based on that information and has the properties defined in the object class. For example, the object class DOG can include the instance variables "dog_type" and "dog_name" and a "bark" method implementing the response to a bark message. An instance of dog, e.g. ROVER, will maintain the type and name instance variables for itself and will respond to the bark message.

Abstract classes are used to describe the interfaces and methods expected to be used by a class without providing detail on the implementation of those methods. Abstract classes are useful in frameworks where the implementation details are to be left to the implementor. Concrete classes are created as subclasses of abstract classes and implement those classes.

An object oriented system is the environment in which the a preferred embodiment of the present invention is implemented. The present invention isolates platform specific event recognition in an event management object, also called an event manager. The rest of the system logic or application is coded for logical event generated by the event manager. The event manager is employed to map platform-specific external events to the platform-independent logical events. As a result, the rest of the system code becomes independent of the platform except for the event manager.

Actions may be triggered for a specific object and logical event combination. The trigger of a logical event on an object adds an event object to the event queue. This event object contains information about the name of the logical event and the target object.

Other objects within the object oriented environment will ask the event manager for call backs for logical events. This process is called the registration of call backs. A call back mechanism is used to allow an existing software module or object to call subroutines or other objects that are available only during run time. The invocation of the run time subroutine or object is called a "call back". The registration information is typically placed into a hash table so that the address of the call back can be retrieved quickly by using the name as a hash key. External events are transformed into logical events using a hash table to define to an action or method to be executed in accordance with a preferred embodiment of the present invention.

Figure 4:
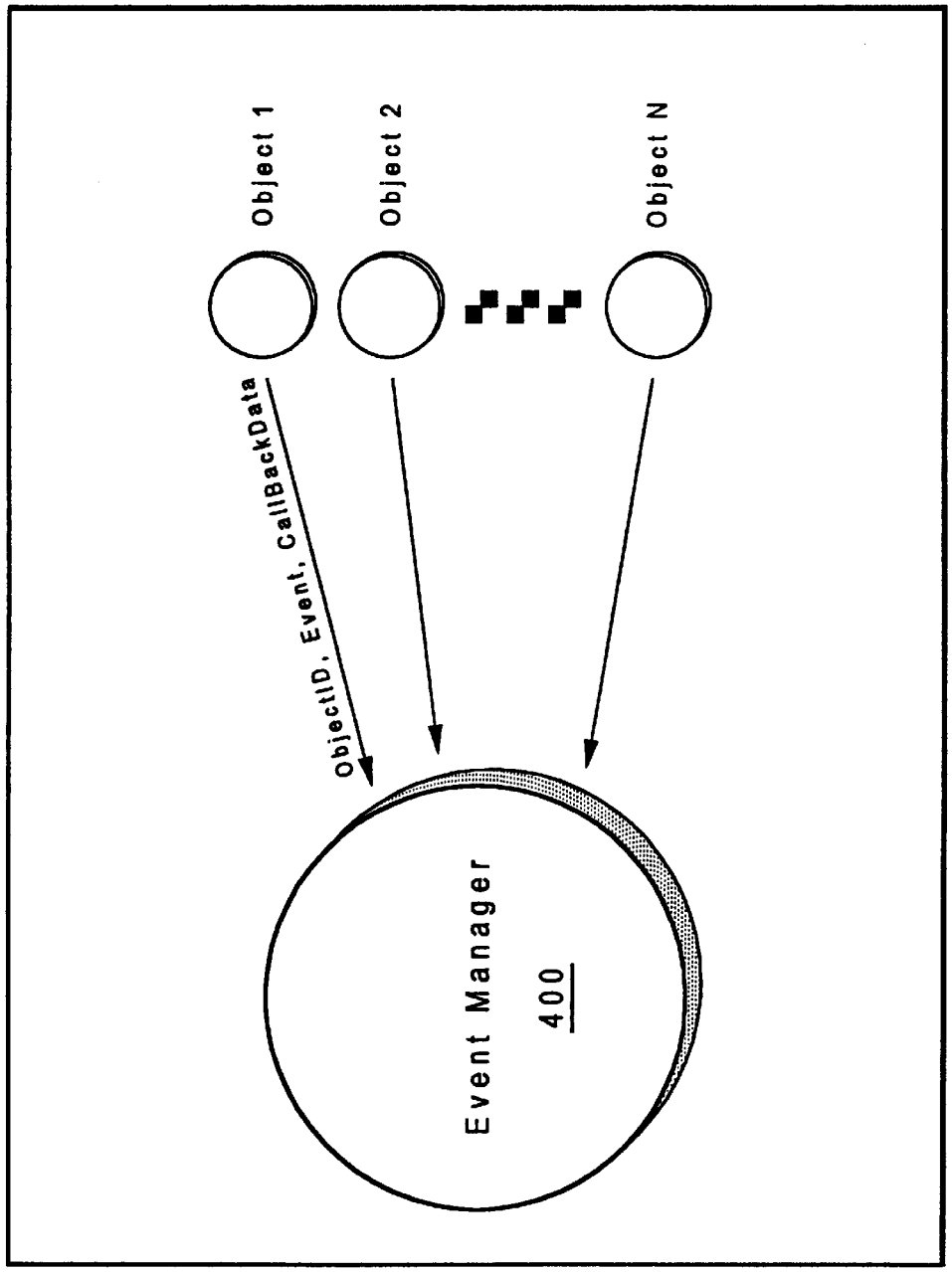
FIG. 4 is a diagram of a process for registration of call backs in accordance with a preferred embodiment of the present invention.

With reference to FIG. 4, a diagram of a process for registration of call backs in accordance with a preferred embodiment of the present invention. Event manager 400 includes a registry table, also called a hash table for maintaining call back registrations. Event manager 400 registers call backs from objects 1-N by receiving an object identification, ObjectID, an event, and an action to be taken, CallBackData, from each of the objects that register a CallBackData. An object such as object 1 registers to event manager 400 local event and CallBackData. The CallBackData contains information about the method for that object or function to call and the data to be passed with the method/function call. The "ObjectID" may or may not be the ID of the object that is registering for the call back. The ObjectID is always the ID of the object, on which that given event is to recognized. For example, if a data entry form wants register for a call back for <FocusChange> event on an entry field, the ObjectID is the ID of the entry field.

Figure 5:
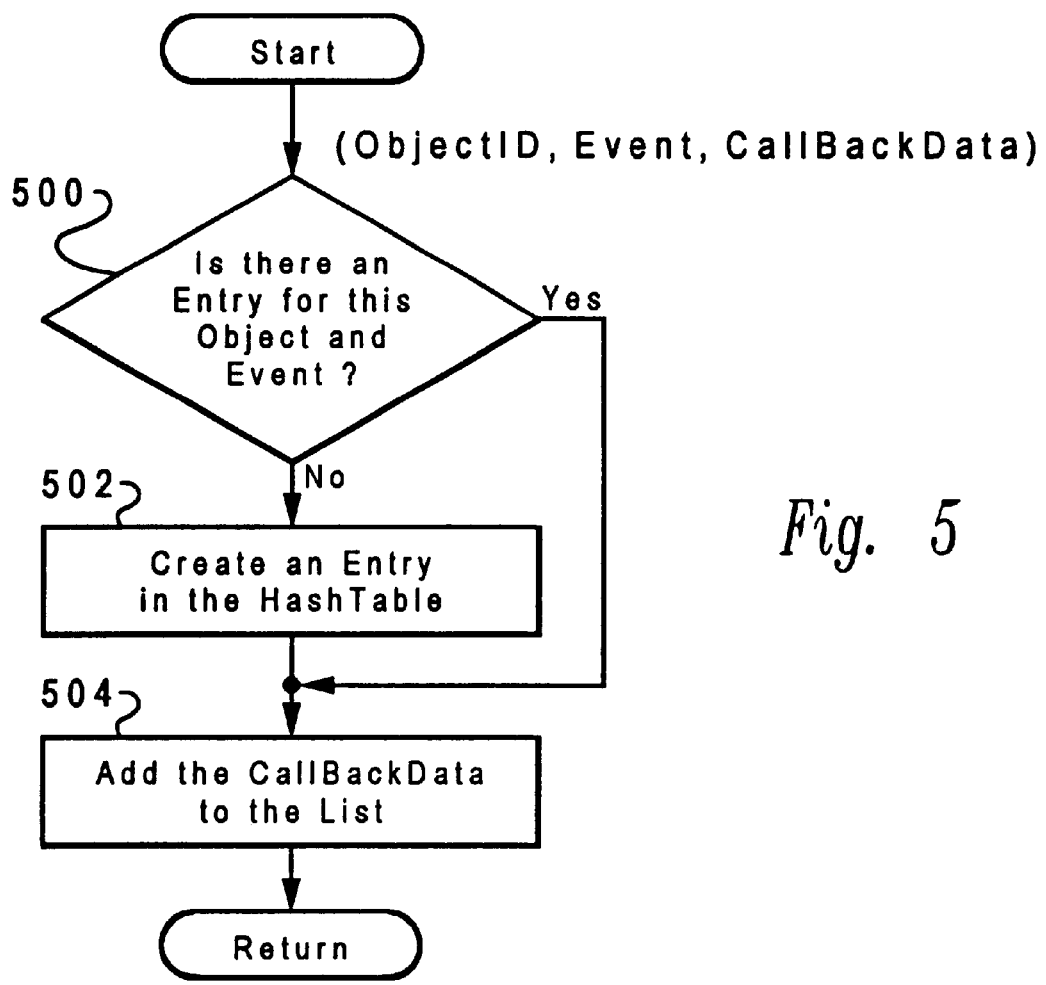
FIG. 5 is a flowchart of a process for registering events with an event manager in accordance with a preferred embodiment of the present invention.

Referring now to FIG. 5, a flowchart of a process for registering events with an event manager is depicted in accordance with a preferred embodiment of the present invention. The process begins by receiving data to register call backs in accordance with a preferred embodiment of the present invention. The information includes an object identification (ObjectID), an event, and an action or method to be executed (CallBackData). The process determines whether an entry exists for this object and event if an object does not exist (step 500). The process then creates an entry in a hash table (step 502). Thereafter, the CallBackData is added to the list (step 504). CallBackData for each event is stored in a list. List contains nodes; each node contains data and a pointer to the next node in the list. The list class can be found in SOM collection classes. A list class provides API's for inserting (adding) and removing an item to the list. Referring again to (step 500), if an entry does exist for the object and the event, the process proceeds to add the CallBackData to the list (step 504) without creating an entry in the hash table. Afterwards, the process terminates.

Figure 6:
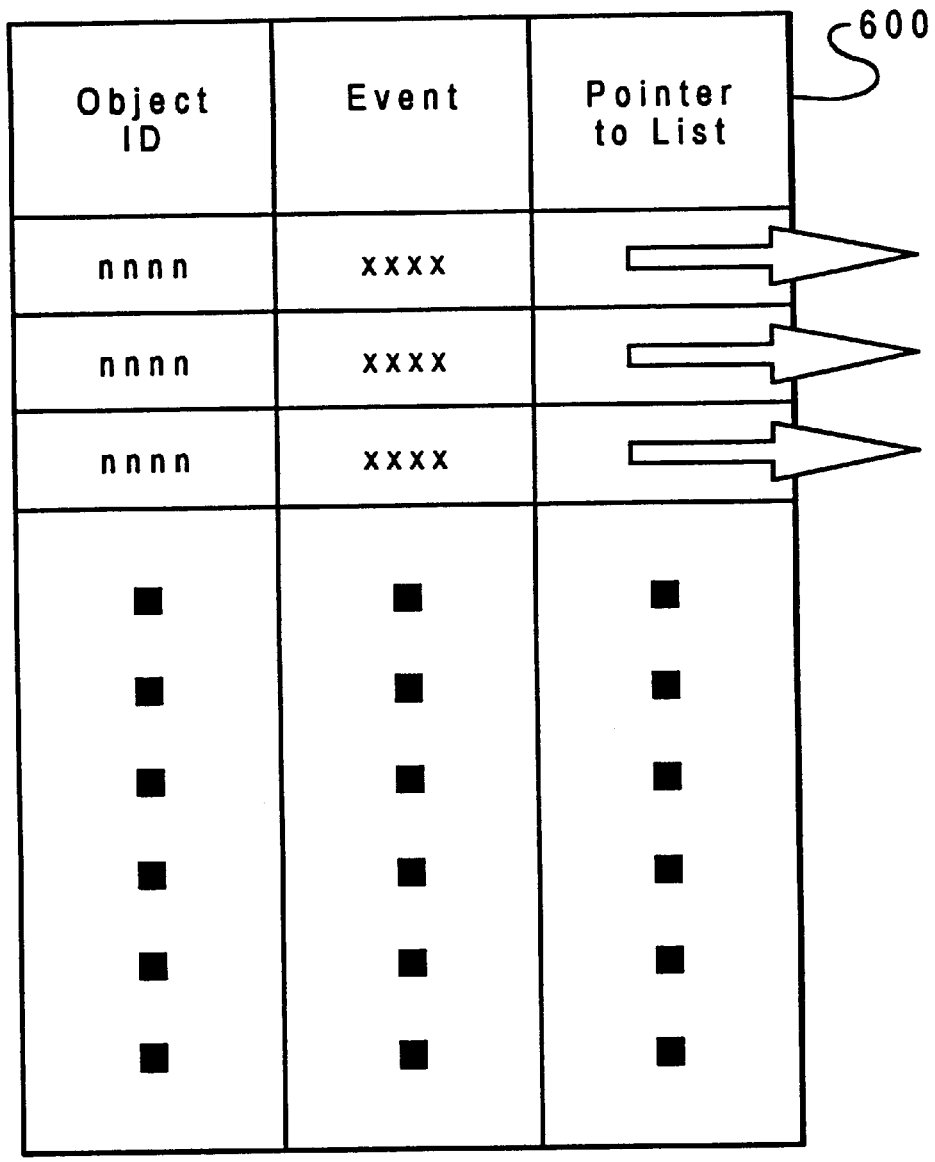
FIG. 6 depicts a registry table, also called a hash table, in accordance with a preferred embodiment of the present invention.

FIG. 6 depicts a registry table, also called a hash table, in accordance with a preferred embodiment of the present invention. Hash table 600 includes entries for ObjectID, event, and a pointer to the list. A list is a collection of nodes linked in a sequence. Each node in the list contains the data and a pointer to the next node. There is a first and a last node in the list. The last node does not have a pointer to the next node. A list class can be found in SOM Collection classes in SOM. A list class provides API's for inserting (adding) and removing a node (data item) to the list. The unique key for hash table 600 is the ObjectID and the event. For each combination of the key, the hash table 600 stores a pointer to a list of call backs. Within hash table 600, an event is an environment independent logical event. A pointer to list is the link list of call backs that need to be performed (dispatched) for the event. Each node in the list contains the CallBackData (method/function pointer and the data to be passed with the callback).

Figure 7:
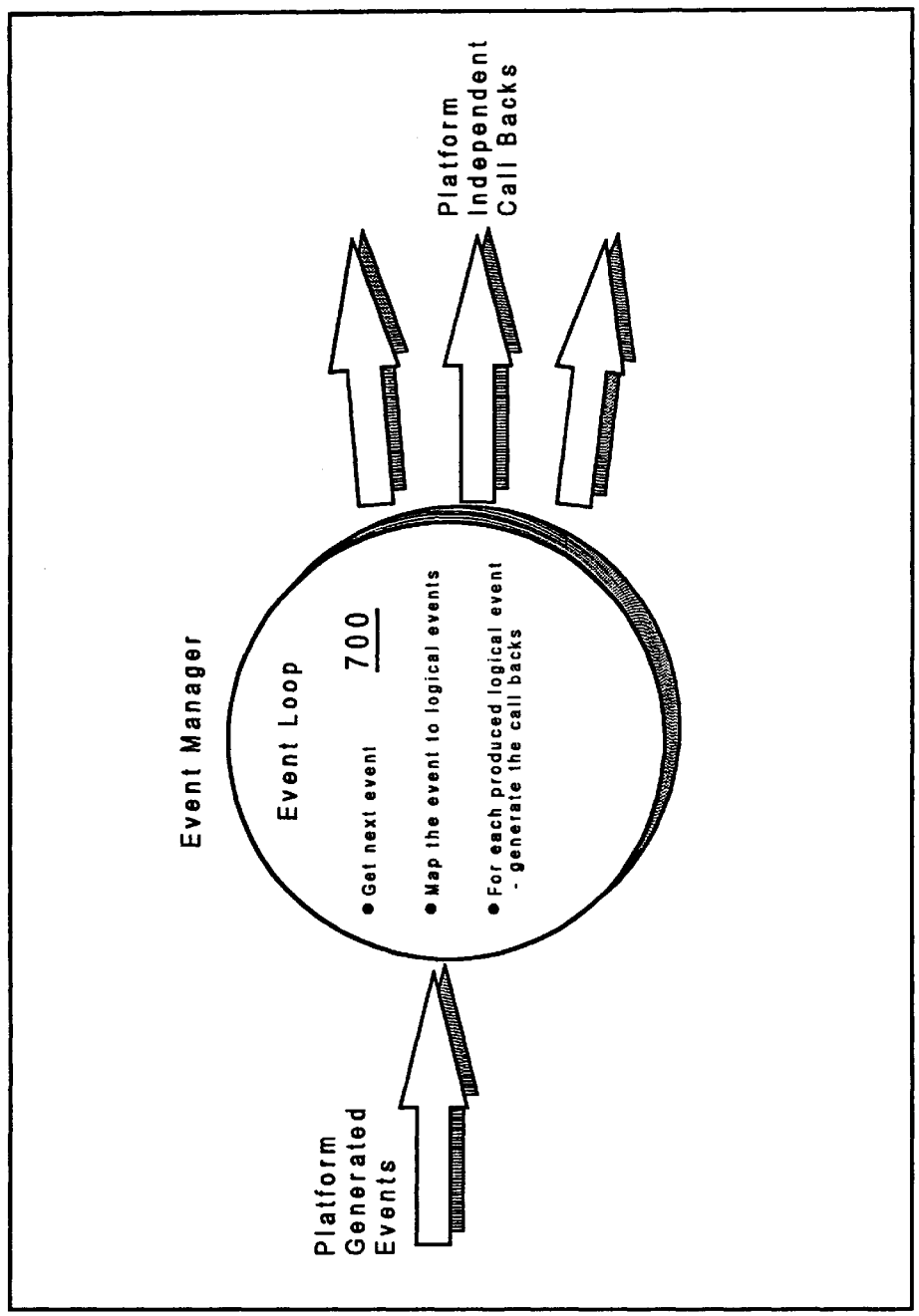
FIG. 7 is a diagram of an event processing loop depicted in accordance with a preferred embodiment of the present invention.

With reference now to FIG. 7, a diagram of an event processing loop is depicted in accordance with a preferred embodiment of the present invention. The event manager contains the main application event loop of the stem and takes over platform specific event loops. Event manager 700 receives platform generated events as an input. In response, the event manager obtains the next event, maps the event to logical elements, and generates a call back for each produced logical event. The output from event manager 700 is in the form of dispatch call backs.

Figure 8:
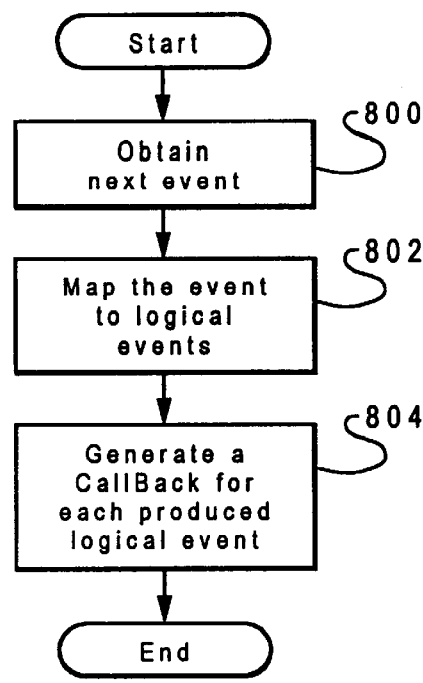
FIG. 8 is a flowchart of an event loop process depicted in accordance with a preferred embodiment of the present invention.

With reference now to FIG. 8, a flowchart of an event loop process depicted in accordance with a preferred embodiment of the present invention. The process begins by obtaining the next event (step 800). Thereafter, the process maps the event to logical events (step 802). Thereafter, the process generates a call back for each produced logical event step 804) with the process terminating thereafter.

Figure 9:
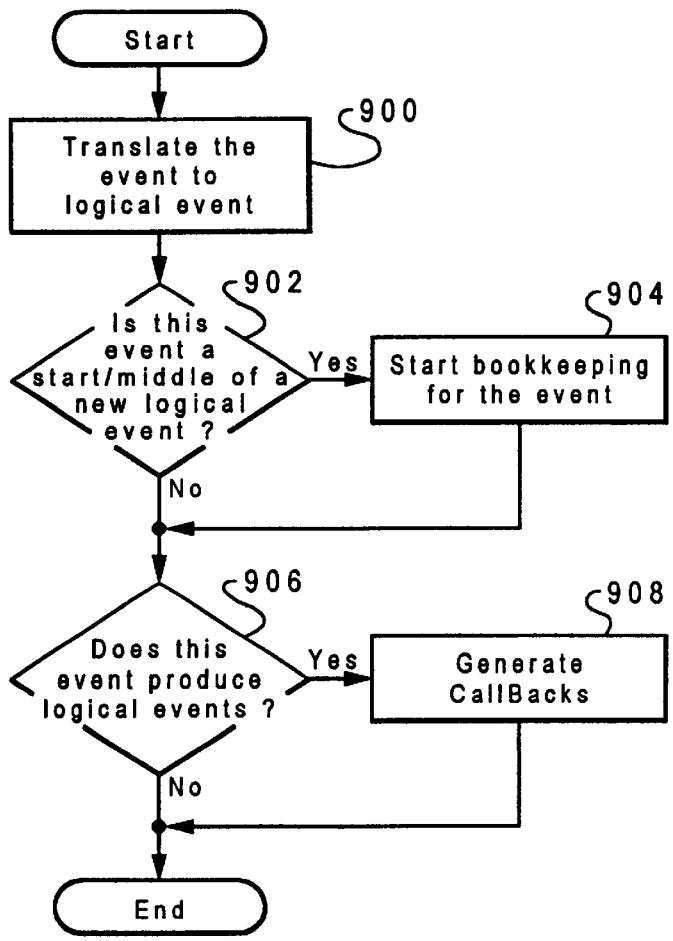
FIG. 9 is a flowchart of a process for mapping to a logical event during event processing depicted in accordance with a preferred embodiment of the present invention.

With reference now to FIG. 9, a flowchart of a process for mapping to a logical event during event processing is depicted in accordance with a preferred embodiment of the present invention. FIG. 9 is a more detailed flowchart of the process depicted in block 802 in FIG. 8. The process employs environment dependent tables for mapping the platform event to a logical event. The process begins by accepting a platform specific event (step 898) and then translates the event to a logical event (step 900). The translation of the platform event to a logical event is made using the mapping table. A mapping table is a table that is specific to each platform. Two columns are present in the table in accordance with a preferred embodiment of the present invention. The first column contains the platform-specific event names and the second column contains the logical platform-independent event names. For example, an OS/2 mapping table may include an OS/2 event, WM_BUTTON1DOWN, in the first column and an independent event, SELECTION_EVENT, to translate a platform specific event (i.e., OS/2 ) to a logical event (i.e., a selection event).

At the translation step, step 900, this mapping table is used for mapping the platform event to the logical event.

Thereafter, the process determines whether this event starts a new logical event (step 902). If a new logical event is started, the process then starts bookkeeping for the event (step 904). Bookkeeping performed is to maintain the status. For example, if a button is pressed, keep that state, so next if the mouse is moved before the button is released, it is a drag event. Thereafter, the process determines whether the event produces a logical event (step 906). If the event produces a logical event, the process then generates a call back (step 908). Referring again to step 906, if the event does not produce a logical event, the process proceeds terminates. Referring again to step 902, if the event does not start a new logical event, the process proceeds directly to step 906 as described above.

Figure 10:
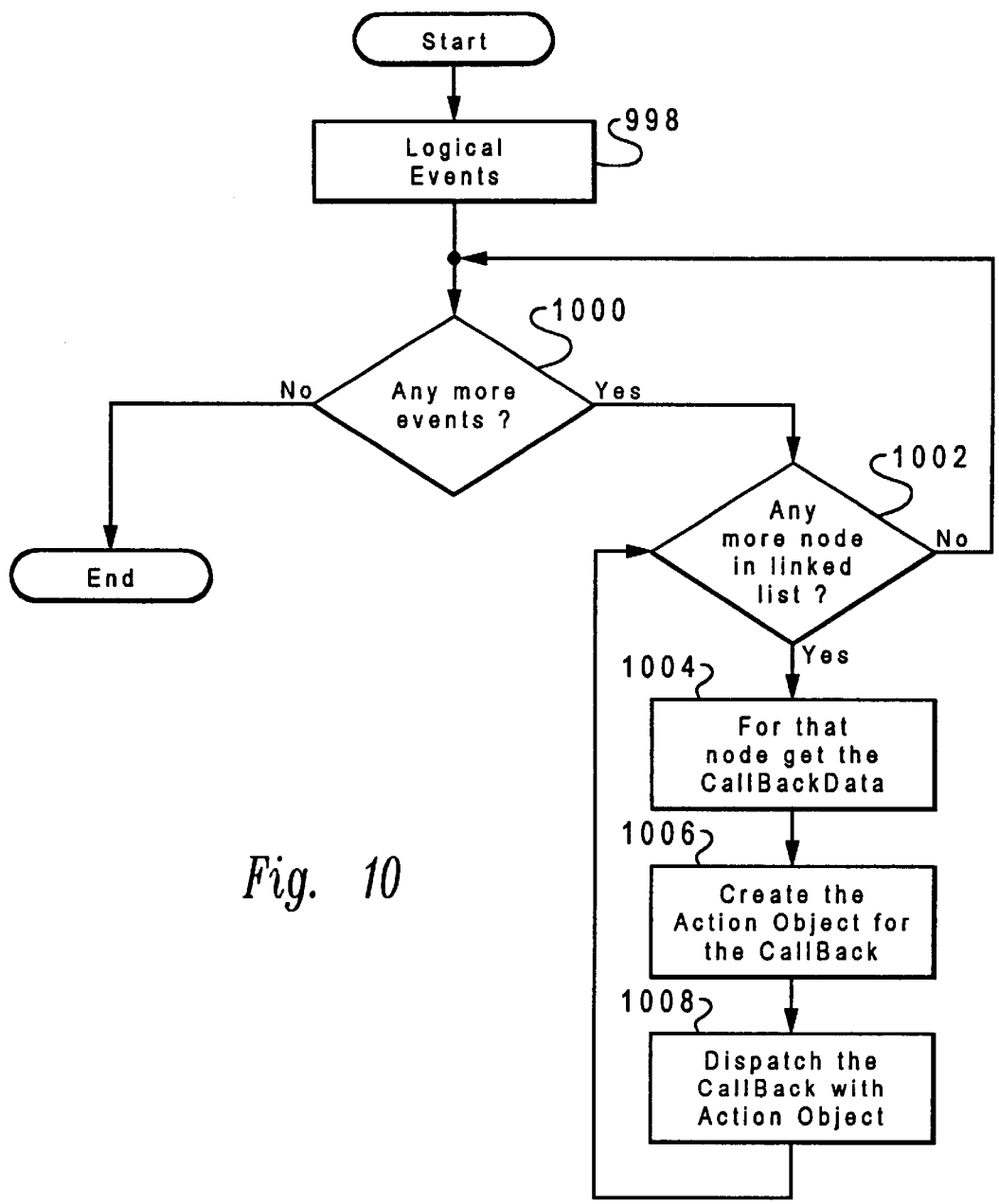
FIG. 10 is a flowchart of a process for generating call backs during event processing depicted in accordance with a preferred embodiment of the present invention.
Figure 1:
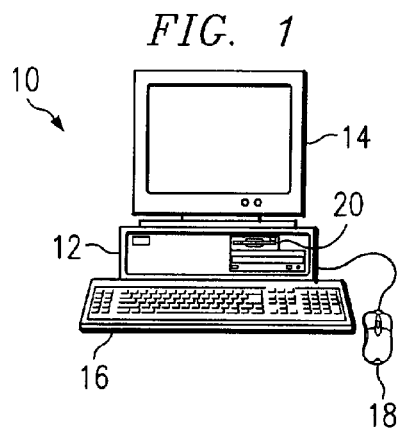

With reference now to FIG. 10, a flowchart of a process for generating call backs during event processing is depicted in accordance with a preferred embodiment of the present invention. This flowchart is a more detailed flowchart of block 908 in FIG. 9. The process begins by accepting logical events as an input (step 998). Next, the process determines whether any more logical events are present (step 1000). If additional events exist, the process then determines whether additional nodes are in the link list (step 1002). If additional nodes are not present in the link list, the process then returns to step 1000.

If, however, additional nodes are present in the link list, the process then obtains the CallBackData for the event and object involved (step 1004). The process then creates an action object for the call back (step 1006). An action object contains the information about the call back. For example, when a button click event happens, the action object will contain the information about the coordinates (x and y) of where the pointer is on a screen when the button click occurred. It may also contain on which object the button click occurred, etc. So the receiver of call back can use this action object to query needed information for that given event. The creation of action object is used to create and instance of the object and fill the event information in accordance with a preferred embodiment of the present invention. Thereafter, the process dispatches the call back with the action object (step 1008) with the process then returning to step 1002. If additional events do not exist, the process then terminates.

In accordance with a preferred embodiment of the present invention, the event manager is designed to manage applications by taking over environment specific event loop processing. In addition, external events are mapped to logical events by using environment specific map tables. For example, PM_mouse_button_1_Pressed external event on OS/2, and X_mouse_button_1_Pressed external event on AIX. Furthermore, with the objects can register actions for a specific logical event on a given target object with the event manager. These actions can be procedure/method calls or scripts. Events are designed in an object oriented fashion and the user can subclass the abstract action object and create new custom objects.

The processes depicted in FIGS. 4–10 may be implemented by those of ordinary skill in the art within the data processing system depicted in FIGS. 1 and 2. The processes of the present invention also may be implemented in a program storage device that is readable by a data processing system, wherein the program storage device encodes data processing system executable instructions coding for the processes of the present invention. The program storage device may take various forms including, for example, but not limited to a hard disk drive, a floppy disk, an optical disk, a ROM, and an EPROM, which are known to those skilled in the art. The processes stored on a program storage device are dormant until activated by using the program storage device with the data processing system. For example, a hard drive containing data processing system executable instructions for the present invention may be connected to a data processing system; a floppy disk containing data processing system executable instructions for the present invention may be inserted into a floppy disk drive in the data processing system; or a ROM containing data processing system executable instructions for the present invention may be connected to the data processing system via a card or adapter connected to an I/O slot.

While the invention has been particularly shown and described with reference to a preferred embodiment, it will be understood by those skilled in the art that various changes in form and detail may be made therein without departing from the spirit and scope of the invention.

What is claimed is:

1. A method in a data processing system for efficiently handling events occurring in an environment in the data processing system, wherein the data processing system includes multiple environments and a plurality of objects that may be used in different environments, wherein each object includes an action that is triggered in response to an event, the method comprising:

creating an event manager object for handling events from different environments;

registering events for the plurality of objects; and triggering an action using the event manager object in response to detecting an event occurring in the data processing system, wherein events occurring in an environment are efficiently handled.

2. The method of claim 1, wherein the step of registering includes registering an identification of the object, an event, and an associated action that is triggered in response to the event.

3. The method of claim 2, wherein the step of registering includes registering the identification of the object, the event, and the associated action that is triggered in response to the event in a hash table.

4. A data processing system for efficiently handling events occurring in an environment in the data processing system, wherein the data processing system includes multiple environments and a plurality of objects that may be used different environments, wherein each object includes an action that is triggered in response to an event, the data processing system comprising:

creation means for creating an event manager object for handling events from different environments;

registration means for registering events for the plurality of objects; and trigger means for triggering an action using the event manager object in response to detecting an event occurring in the data processing system, wherein events occurring in an environment are efficiently handled.

5. The data processing system of claim 4, wherein the registration means includes means for registering an identification of the object, an event, and an associated action that is triggered in response to the event.

6. A data processing system for efficiently handling events occurring in an environment in the data processing system, wherein the data processing system includes multiple environments and a plurality of objects that may be used in different environments, wherein each object includes an action that is triggered in response to an event, the data processing system comprising:

creation means for creating an event manager object for handling events from different environments;

registration means for registering events for the plurality of objects; and trigger means for triggering an action using the event manager object in response to detecting an event occurring in the data processing system, wherein events occurring in the environment are efficiently handled;

wherein the registration means includes means for registering an identification of the object, an event, and an associated action that is triggered in response to the event; and wherein the means for registering an identification of the object, an event, and an associated action that is triggered in response to the event includes means for registering the identification of the object, the event, and the associated action that is triggered in response to the event in a hash table.

7. A data processing system for efficiently handling events occurring in an environment in the data processing system, wherein the data processing system includes external events that originate from different environments and logical events that are handled by a single independent mechanism, the data processing system comprising:

detection means for detecting an external event;

transformation means for transforming the external event into a logical event; and processing means processing the transformed external event using the mechanism for handling logical events, wherein external events are handled efficiently.

8. A storage device readable by a data processing system and encoding data processing system executable instructions for handling events occurring in an environment in the data processing system, wherein the data processing system includes multiple environments and a plurality of objects that may be used different environments, wherein each object includes an action that is triggered in response to an event, the data storage device comprising:

means for creating an event manager object for handling events from different environments;

means for registering events for the plurality of objects; and means for triggering an action using the event manager object in response to detecting an event occurring in the data processing system, wherein the means are activated when the storage device is connected to and accessed by a data processing system.

9. The storage device of claim 8, wherein said storage device is a hard disk drive.

10. The storage device of claim 8, wherein said storage device is a ROM for use with a data processing system.

11. The storage device of claim 8, wherein said storage device is a floppy diskette.

12. The storage device of claim 8, wherein said storage device is a RAM in a data processing system.

13. A data processing system for efficiently handling events occurring in an environment in the data processing system, the data processing system comprising:

a plurality of environments in the data processing system;

a plurality of objects executing in the plurality of environments, wherein each object includes an action that is triggered in response to an event; and an event manager including:
receiving means for receiving an event specific to an environment;
mapping means for mapping the received event specific to an environment to a logical event; and
generation means for generating at least one callback for each logical event.

14. The data processing system of claim 13, wherein the generation means in the event manager object comprises:

means for obtaining callback data for each logical event;

means for creating an action object and associating the action object with the callback; and means for dispatching the callback with the action object.

15. The data processing system of claim 14, wherein the event manager object further includes means for registering events for the plurality of objects.

16. A computer for efficiently handling events occurring in an environment in the data processing system, the computer comprising:

a plurality of environments in the computer;

a plurality of objects executing in the plurality of environments, wherein each object includes an action object that is triggered in response to an event; and an event manager including:
receiving means for receiving an external event specific to an environment within the plurality of environments, wherein the external event is a received external event specific to the environment; and
mapping means for transforming the received external event specific to the environment to an internal event.

17. The computer of claim 16, wherein the event manager includes generation means for generating a call back for the internal event.

18. The computer of claim 16, wherein the mapping means includes a table for the environment, the table having entries for transforming external events specific to the environment into internal events, wherein the received external event specific to the environment is transformed into the internal event using the table.

19. The computer of claim 17, wherein the event manager further comprises:

creation means for creating a new action object for the call back, wherein the new action object includes information about the call back.

20. A computer for efficiently handling events occurring in an environment in the data processing system, the computer comprising:

a plurality of environments in the computer;

a plurality of objects executing in the plurality of environments, wherein each object includes an action object that is triggered in response to an event; and an event manager including:
receiving means for receiving an external event specific to an environment within the plurality of environments, wherein the external event is a received external event specific to the environment; and
mapping means for transforming the received external event specific to the environment to an internal event;
generation means for generating a call back for the internal event; and
creation means for creating a new action object for the call back, wherein the new action object includes information about the call back; and a receiver of the call back, wherein the receiver of the call back uses the new action object to query needed information for the internal event.

21. A computer program product for use with a computer for efficiently handling events occurring in an environment in the computer, wherein the computer includes multiple environments and a plurality of objects that may be used in different environments, wherein each object is triggered in response to an external event, the computer program product comprising:

a computer usable medium;

a first instruction for receiving an external event specific to an environment within the plurality of environments, wherein the external event is a received external event; and second instructions for transforming the received external event to an internal event, wherein the instructions are embodied within the computer usable medium.

22. The computer program product of claim 21 further comprising:

third instructions for generating a call back for the internal event.

* * * * *

UNITED STATES PATENT AND TRADEMARK OFFICE
CERTIFICATE OF CORRECTION

PATENT NO.   : 6,226,693 B1
DATED        : May 1, 2001
INVENTOR(S)  : Chow et al.

It is certified that error appears in the above-identified patent and that said Letters Patent is hereby corrected as shown below:

<u>Title page,</u>
Item [75], Inventors, please delete "ChungHen Chow" and insert
-- Alex ChungHen Chow --.
The title page, showing the illustrative figure, should be deleted and substitute therefore with the attached title page.

<u>Drawings,</u>
Please delete the figures 1-10 and insert the figures 1-10 as attached hereto.

<u>Column 2,</u>
Line 29, after "in", please delete "Systems" and insert -- System --.
Line 65, after "being", please delete "depend" and insert -- dependent --.

Signed and Sealed this

Eighteenth Day of February, 2003

JAMES E. ROGAN
*Director of the United States Patent and Trademark Office*

(12) United States Patent
Chow et al.

(10) Patent No.: US 6,226,693 B1
(45) Date of Patent: May 1, 2001

(54) METHOD AND SYSTEM FOR LOGICAL EVENT MANAGEMENT

(75) Inventors: ChungHen Chow; Nurcan Coskun; Kalpesh Jashbhai Patel; Bruce Allan Tate, all of Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 08/941,323

(22) Filed: Sep. 30, 1997

Related U.S. Application Data

(63) Continuation of application No. 08/375,149, filed on Jan. 19, 1995, now abandoned.

(51) Int. Cl.[7] ............................. G06F 9/00; G06F 9/46
(52) U.S. Cl. ......................................... 709/318; 709/319
(58) Field of Search .............................. 395/680–685; 709/300–305, 310–332

(56) References Cited

U.S. PATENT DOCUMENTS

| | | | |
|---|---|---|---|
| 4,672,532 | 6/1987 | JongeVos | 364/200 |
| 4,734,854 | 3/1988 | Afshar | 364/200 |
| 5,097,533 | 3/1992 | Burger et al. | 395/500 |
| 5,233,686 | 8/1993 | Rickenbach et al. | 395/158 |
| 5,237,684 | 8/1993 | Record et al. | 395/650 |
| 5,280,613 | 1/1994 | Chan et al. | 395/700 |
| 5,341,478 | * 8/1994 | Travis et al. | 395/700 |
| 5,430,875 | * 7/1995 | Ma | 395/700 |
| 5,438,659 | * 8/1995 | Notess et al. | 395/155 |
| 5,566,337 | * 10/1996 | Szymanski et al. | 395/733 |
| 5,613,090 | * 3/1997 | Willems | 395/500 |

FOREIGN PATENT DOCUMENTS

0474339 * 11/1992 (EP)

5-324339 7/1993 (JP) ............................. G06F/9/44

OTHER PUBLICATIONS

Macintosh, Inside Macintosh:Interapplication Communication; Chapters 3–6, Jul. 1993.*
Macintosh, Inside macintosh:Macintosh Toolbox Essentials; Chapter 2, 1992.*
"Portable Object–Oriented Event Manager", IBM Technical Disclosure Bulletin, vol. 37, issue 6B, pp. 553–556, Jun. 1994.*
SOM Objects Developer Toolkit Users Guide Chap. 12, Jun. 1993.*
Ford, Dan; "Associations in C++" Dr. Dobb's Journal on CDROM, Aug. 1994.*
Class Objects in Som Nurcan Coskun & Roger Sessions, IBM Personal Systems Developer (Summer 92), pp. 67–77.*
Object–Oriented Programming in OS/22.0, Roger Sessions & Nurcan Coskun, IBM Personal System Developer (Winter 92) pp. 107–119.*

* cited by examiner

Primary Examiner—Majid Banankhah
Assistant Examiner—P. G. Caldwell
(74) Attorney, Agent, or Firm—Jeffrey S. LaBaw; Duke W. Yee

(57) ABSTRACT

A method and system for efficiently handling events occurring in an environment in a data processing system. The data processing system includes multiple environments and objects that may be used in different environments. Each object includes an action that is triggered in response to an event. An event manager object is created for handling events from different environments. Events are registered for the objects. An action is triggered using the event manager object in response to detecting an event occurring in the data processing system, wherein events occurring in an environment are efficiently handled.

22 Claims, 4 Drawing Sheets

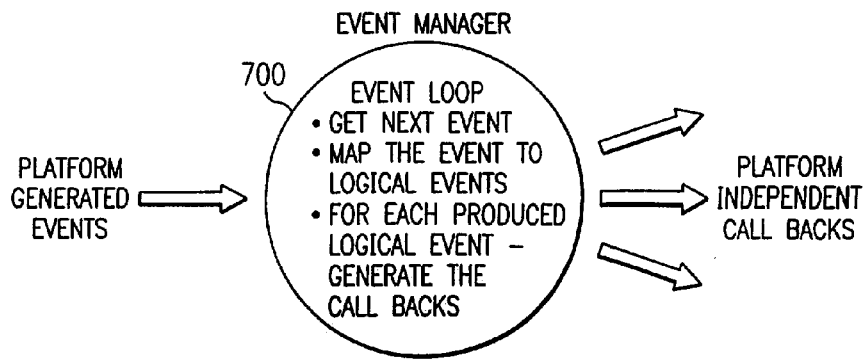

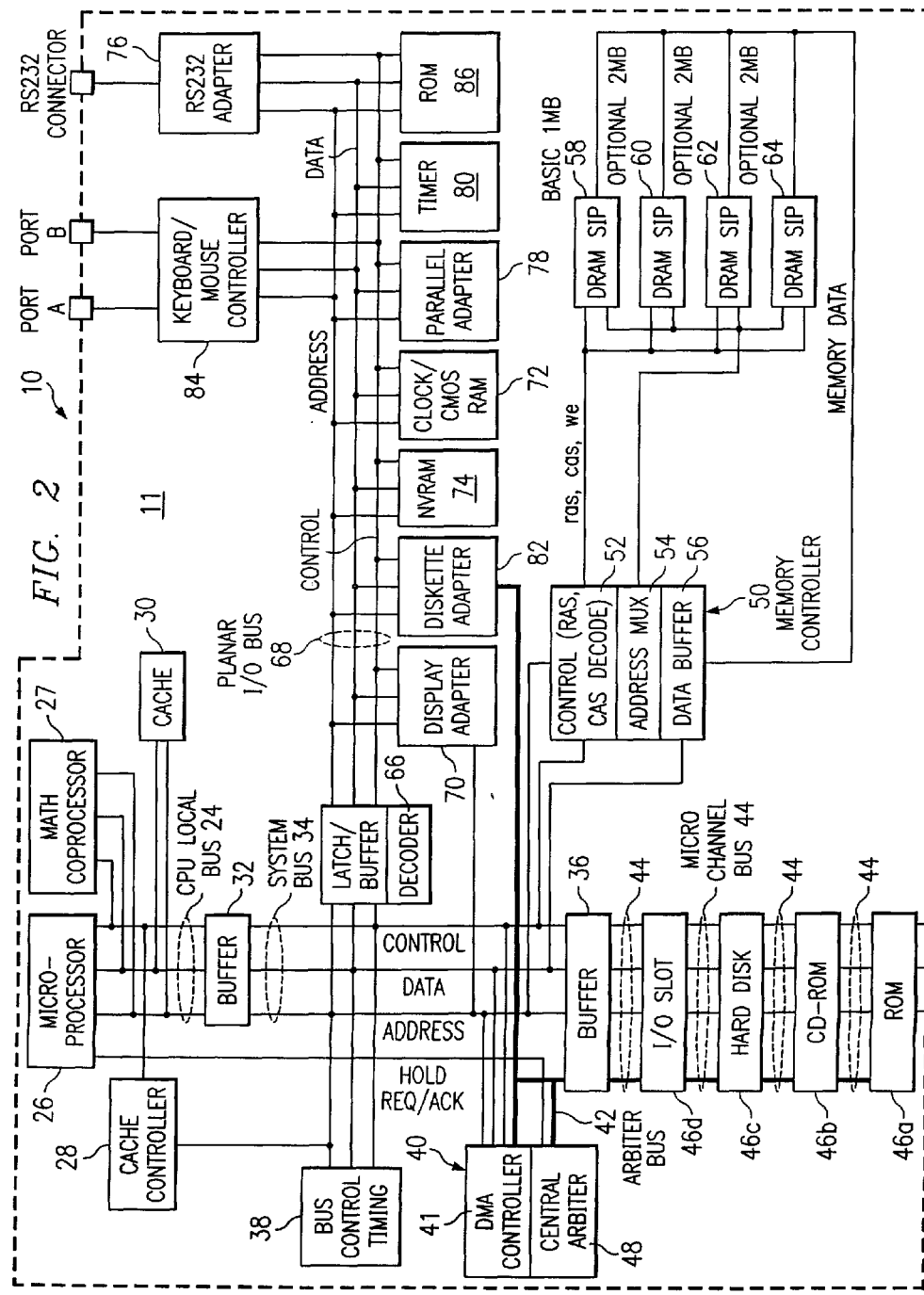

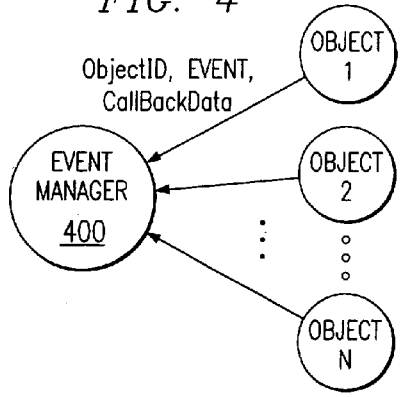
FIG. 4
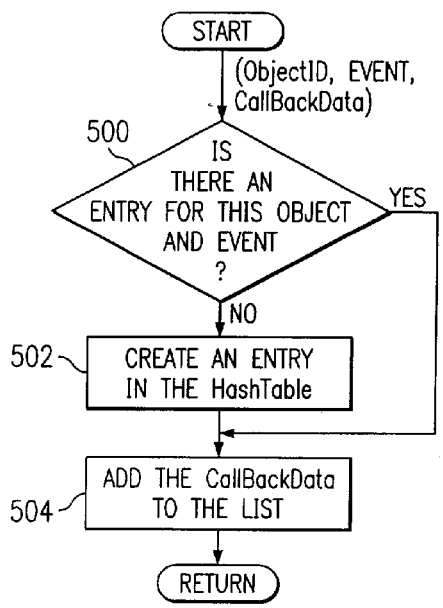
FIG. 5
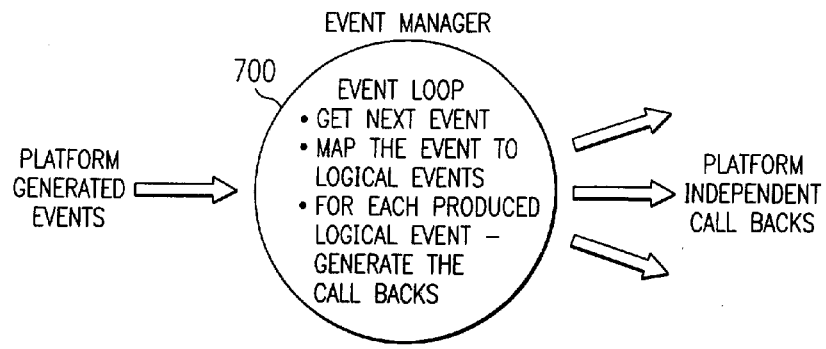
FIG. 6
FIG. 7